(12) United States Patent
Yamada et al.

(10) Patent No.: US 8,152,240 B2
(45) Date of Patent: Apr. 10, 2012

(54) VEHICULAR SEAT DEVICE

(75) Inventors: Masayuki Yamada, Aichi-ken (JP);
Takeshi Tokai, Okazaki (JP); Keisuke Onoda, Nagoya (JP)

(73) Assignees: Toyota Jidosha Kabushiki Kaisha, Toyota-shi, Aichi-ken (JP); Toyota Boshoku Kabushiki Kaisha, Kariya-shi, Aichi-ken (JP)

( * ) Notice: Subject to any disclaimer, the term of this patent is extended or adjusted under 35 U.S.C. 154(b) by 431 days.

(21) Appl. No.: 12/375,701

(22) PCT Filed: Jul. 27, 2007

(86) PCT No.: PCT/IB2007/002154
§ 371 (c)(1),
(2), (4) Date: Jan. 30, 2009

(87) PCT Pub. No.: WO2008/015527
PCT Pub. Date: Feb. 7, 2008

(65) Prior Publication Data
US 2009/0322134 A1      Dec. 31, 2009

(30) Foreign Application Priority Data
Jul. 31, 2006   (JP) .................................. 2006-207624

(51) Int. Cl.
*B60N 2/30*    (2006.01)
(52) U.S. Cl. ... 297/321; 297/334; 297/335; 297/378.12; 296/65.09
(58) Field of Classification Search .................. 297/321, 297/334, 335, 378.12; 296/65.01, 65.05, 296/65.09
See application file for complete search history.

(56) References Cited

U.S. PATENT DOCUMENTS

| | | | |
|---|---|---|---|
| 5,671,948 A * | 9/1997 | Susko et al. | 280/801.1 |
| 7,040,702 B2 * | 5/2006 | Yamada et al. | 297/331 |
| 7,086,696 B2 * | 8/2006 | Yudovich | 297/335 |
| 7,134,725 B2 * | 11/2006 | Hofmann et al. | 297/378.1 |

(Continued)

FOREIGN PATENT DOCUMENTS

DE    103 55 486 A1    7/2004

(Continued)

OTHER PUBLICATIONS

"Notification of Reasons for Refusal" dated Apr. 23, 2008, in Japanese Patent Application No. 2006-207624, filed Jul. 31, 2006.

*Primary Examiner* — Peter R. Brown
(74) *Attorney, Agent, or Firm* — Finnegan, Henderson, Farabow, Garrett & Dunner, LLP (57) ABSTRACT

A vehicular seat device has a first linking member (21) that is linked to a front portion of a seat cushion frame (16) and to a base member (24) so as to be respectively pivotable, and a second linking member (22) that is pivotably linked to a rear portion of the seat cushion frame (16) and is also pivotably linked to a position on a seatback frame (18) which is upward of a reclining mechanism (26) when the seatback is in a standing state. The seat arrangements thereof include a retracted state in which the seatback (14) is superimposed on the upper side of the seat cushion (12), and an entry/exit state in which the seat cushion (12) is placed in the standing state producing a space for an occupant's entry or exit behind the seat.

8 Claims, 9 Drawing Sheets

U.S. PATENT DOCUMENTS

| | | | |
|---|---|---|---|
| 7,568,764 B2 * | 8/2009 | Harper et al. | 297/331 |
| 7,578,537 B2 * | 8/2009 | Baetz et al. | 296/65.09 |
| 7,658,447 B2 * | 2/2010 | Soditch et al. | 297/335 |
| 7,901,005 B2 * | 3/2011 | Khan et al. | 297/331 |
| 2003/0218348 A1 | 11/2003 | Yoshino et al. | |
| 2004/0056521 A1 * | 3/2004 | Kayumi et al. | 297/334 |
| 2004/0212237 A1 * | 10/2004 | Epaud et al. | 297/331 |
| 2005/0269830 A1 | 12/2005 | Epaud | |

FOREIGN PATENT DOCUMENTS

| | | |
|---|---|---|
| DE | 10 2004 008 177 A1 | 9/2004 |
| JP | 2002-362202 | 12/2002 |
| JP | 2003-80988 | 3/2003 |
| JP | 2004-131075 | 4/2004 |
| JP | 2004-249109 | 9/2004 |
| JP | 2005-335697 | 12/2005 |

* cited by examiner

VEHICULAR SEAT DEVICE

CROSS-REFERENCE TO RELATED APPLICATIONS

This application is a national phase application of International Application No. PCT/IB2007/002154, filed Jul. 27, 2007, and claims the priority of Japanese Application No. 2006-207624, filed Jul. 31, 2006, the contents of both of which are incorporated herein by reference.

BACKGROUND OF THE INVENTION

1. Field of the Invention

The invention relates to a vehicular seat device.

2. Description of the Related Art

A vehicular seat that includes a front link leg linked to a seat cushion and a support so as to be capable of pivot movements, a rear link leg linked to a seatback and the support so as to be capable of pivot movements, and an intermediate link leg linked to the seatback and the support so as to be capable of pivot movements, wherein a rear portion of the seat cushion is attached to the seatback so as to be capable of pivot movements, is disclosed in Japanese Patent Application Publication No. JP-A-2005-335697.

The vehicular seat described in the above has a structure that is changeable to a seat arrangement in which the seatback is superimposed on the seat cushion, and a seat arrangement in which the seat cushion is flipped up to reduce the longitudinal width of the seat in order to produce a space behind the seat. However, when the seat is to be changed to the latter arrangement, that is, a form in which the longitudinal width of the seat is made smaller, it is necessary to perform an operation of once raising the seat upward relative to the vehicle. Therefore, it is considered that a burden is given to a person who performs the seat operation.

SUMMARY OF THE INVENTION

It is an object of the invention to provide a vehicular seat device capable of being put in various seat arrangements without giving large operation load to a person who performs a seat operation.

A vehicular seat device according to a first aspect of the invention has: a seat cushion having a seat cushion frame; a seatback having a seatback frame and provided on a base member via a reclining mechanism so that an inclination angle of the seatback is adjustable; a first linking member whose first end is pivotably linked to the seat cushion frame and whose second end is pivotably linked to the base member; and a second linking member whose first end is pivotably linked to a portion of the seat cushion frame which is rearward of a linking position to the first linking member and whose second end is pivotably linked to a portion of the seatback frame which is upward of the reclining mechanism relative to a vehicle when the seatback is in a standing state. Seat arrangements of the vehicular seat device include a retracted position in which the seat cushion is moved forward downward relative to the vehicle and the seatback is superimposed on an upper side of the seat cushion when the seatback is tilted forward, and an entry/exit state in which the seat cushion is in the standing state producing a space for entry or exit rearward of the vehicular seat device when the seatback is tilted forward.

According to the vehicular seat device of the first aspect, the seat arrangement can be changed by a simple operation, and various seat arrangements can be set without giving large operation load to a person who performs the seat operation.

In the foregoing aspect, the seat arrangements of the vehicular seat device may further include a seating state in which the seatback is not tilted forward, and the seat cushion is not moved forward downward relative to the vehicle or the seat cushion is not in the standing state.

In the foregoing aspect, the vehicular seat device may further include a lock member pivotably provided on the seat cushion frame, and a second urging portion that urges the lock member in such a direction as to engage the lock member with the first end of the second linking member, wherein the lock member may be engaged with the first end of the second linking member when the seat arrangement is the seating state or the retracted state.

In the foregoing aspect, the vehicular seat device may further include a first urging portion that is provided on the first end of the first linking member and that urges the seat cushion in such a direction as to flip up a rear side of the seat cushion.

In the foregoing aspect, the vehicular seat device may further include an operating lever for changing the seat arrangement. It is also allowable that by a first operation, linking between the first end of the second linking member and the lock member be released, and as the seatback is tilted forward, the rear side of the seat cushion flip upward relative to the vehicle.

In the foregoing aspect, the second linking member may have a curved portion, and the curved portion may be curved downward relative to the vehicle when the seat arrangement is the seating state. Furthermore, the curved portion may be positioned downward of the seat cushion frame when the seat arrangement is the seating state.

In the foregoing aspect, the vehicular seat device may further include a support member that is provided on the base member and that is protruded forward diagonally upward relative to the vehicle, wherein the second linking member is supported by the support member.

In the foregoing aspect, the vehicular seat device may further include a stopper that is provided on a face of the seatback frame facing sideward relative to the vehicle so that when the seat arrangement is the seating state, the stopper contacts a face of the second linking member facing rearward relative to the vehicle.

In the foregoing aspect, the first linking member may be detachably engageable with the base member.

According to the vehicular seat device of the foregoing aspect, when the seatback is tilted forward, the front side of the seat cushion can be flipped upward relative to the vehicle about the linking portion of the seat cushion frame to the second linking member. Therefore, the seat arrangement can be changed to a form in which the longitudinal width of the seat is made smaller, so as to produce a large space for an occupant's entry or exit behind the seat.

In the foregoing aspect, the vehicular seat device may further include a lock member pivotably provided on the seat cushion frame, and a pin which is provided on the second linking member that engages with the lock member, and which engages with the lock member. The lock member may be engaged with the pin when the seat arrangement is the entry/exit state.

In the foregoing aspect, the vehicular seat device may further include an operating lever for changing the seat arrangement, and by a first operation, linking between the second end of the first linking member and the base member is released, and as a front side of the seat cushion is flipped upward relative to the vehicle, the lock member and the pin may be engaged.

A vehicular seat device according to a second aspect of the invention has: a seatback having a seatback frame and provided on a base member via a reclining mechanism so that an inclination angle of the seatback is adjustable; a seat cushion whose seat cushion frame is pivotably linked to a position on the seatback frame which is upward of the reclining mechanism relative to a vehicle when the seatback is in a standing state; and a linking member whose first end is pivotably linked to a front portion of the seat cushion frame, and whose second end is detachably engageable with the base member by a lock member and becomes pivotable relative to the base member when the second end is engaged to the base member. Seat arrangements of the vehicular seat device include a retracted state in which the seat cushion is moved forward downward relative to the vehicle and the seatback is superimposed on an upper side of the seat cushion when the seatback is tilted forward, and an entry/exit state in which the seat cushion is in the standing state producing a space for entry or exit rearward of the vehicular seat device when the seatback is tilted forward.

According to the vehicular seat device of the second aspect, when the seatback is tilted forward, the linking member is disengaged from the base member so that the front side of the seat cushion can be flipped upward relative to the vehicle about the linking portion of the seatback frame to the seat cushion frame. Thus, the seat arrangement can be changed to the entry/exit state. Furthermore, when the seatback is tilted forward, the seat cushion is moved forward downward relative to the vehicle, and the seatback is superimposed on the upper side of the seat cushion. Thus, the seat arrangement changes to the retracted state. In this manner, the seat arrangement can be changed by a simple operation, and various seat arrangements can be set without giving large operation load to a person who performs the seat operation.

In the foregoing aspect, the vehicular seat device may further include an urging portion that is provided on the first end of the seat cushion frame and that urges the seat cushion frame in such a direction as to flip up a front side of the seat cushion frame.

In the foregoing aspect, the vehicular seat device may further include a lock member pivotably provided on the seatback frame, and a pin that is provided on the seat cushion frame and that engages with the lock member, and the lock member may be engaged with the pin when the seat arrangement is the entry/exit state.

In the foregoing aspect, the vehicular seat device may further include an operating lever for changing the seat arrangement, and by a first operation, linking between the second end of the linking member and the base member is released and the lock member is pivoted, and as a front side of the seat cushion is flipped upward relative to the vehicle, the lock member and the pin are engaged.

In the foregoing aspect, the base member may be disposed on a seat slide mechanism that adjusts a seat position in a longitudinal direction relative to the vehicle.

According to the vehicular seat device of the foregoing aspect, when the seat arrangement is changed to the entry/exit state in which the longitudinal width of the seat is small, the entire seat can be moved forward relative to the vehicle, whereby a further enlarged space for an occupant's entry or exit behind the seat can be produced.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF THE EXAMPLE EMBODIMENTS

Embodiments of the invention will be described hereinafter with reference to the drawings.

Figure 1:
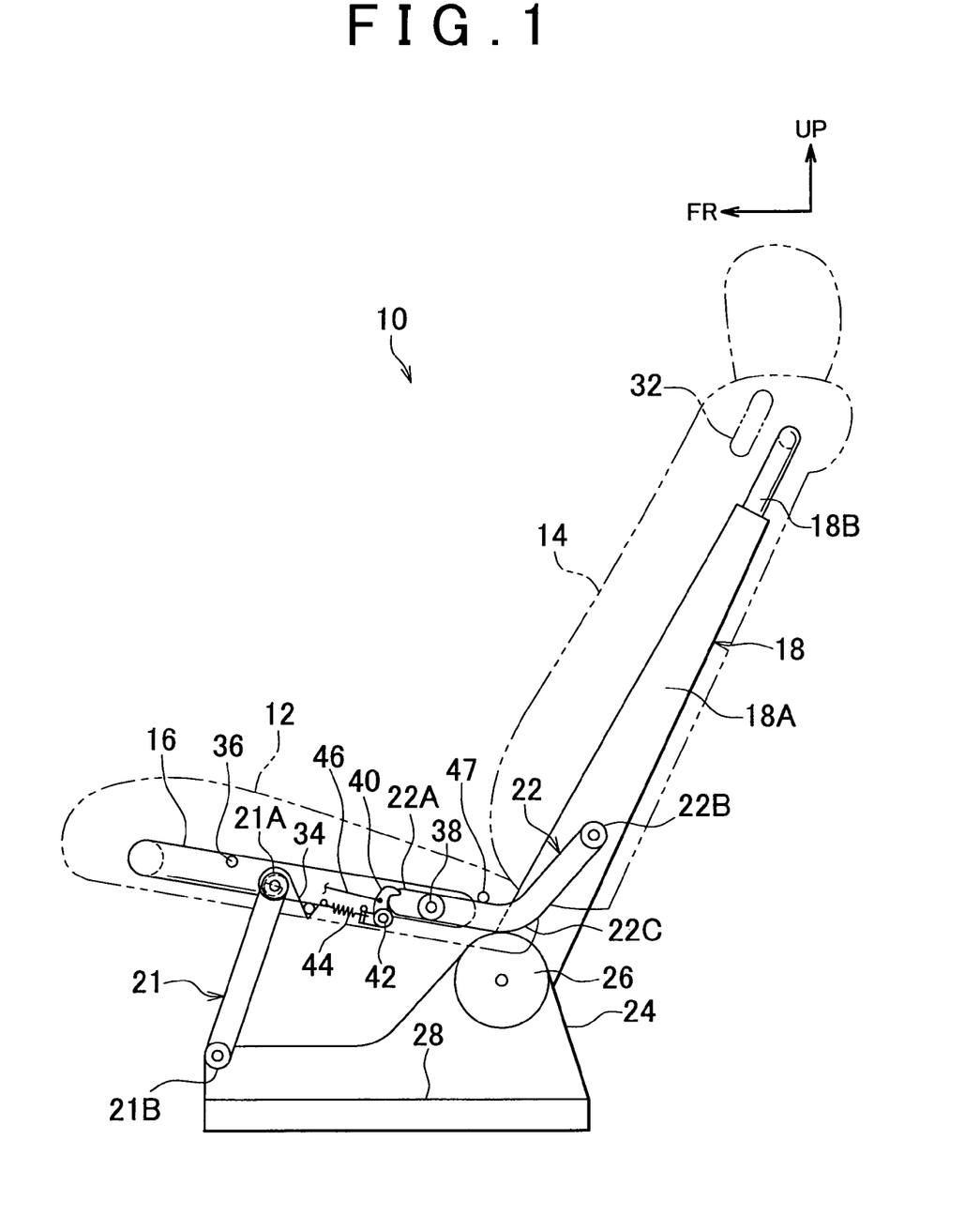
FIG. 1 is a side view showing a vehicular seat device in accordance with a first embodiment of the invention when the seat arrangement is a seating state.
Figure 2:
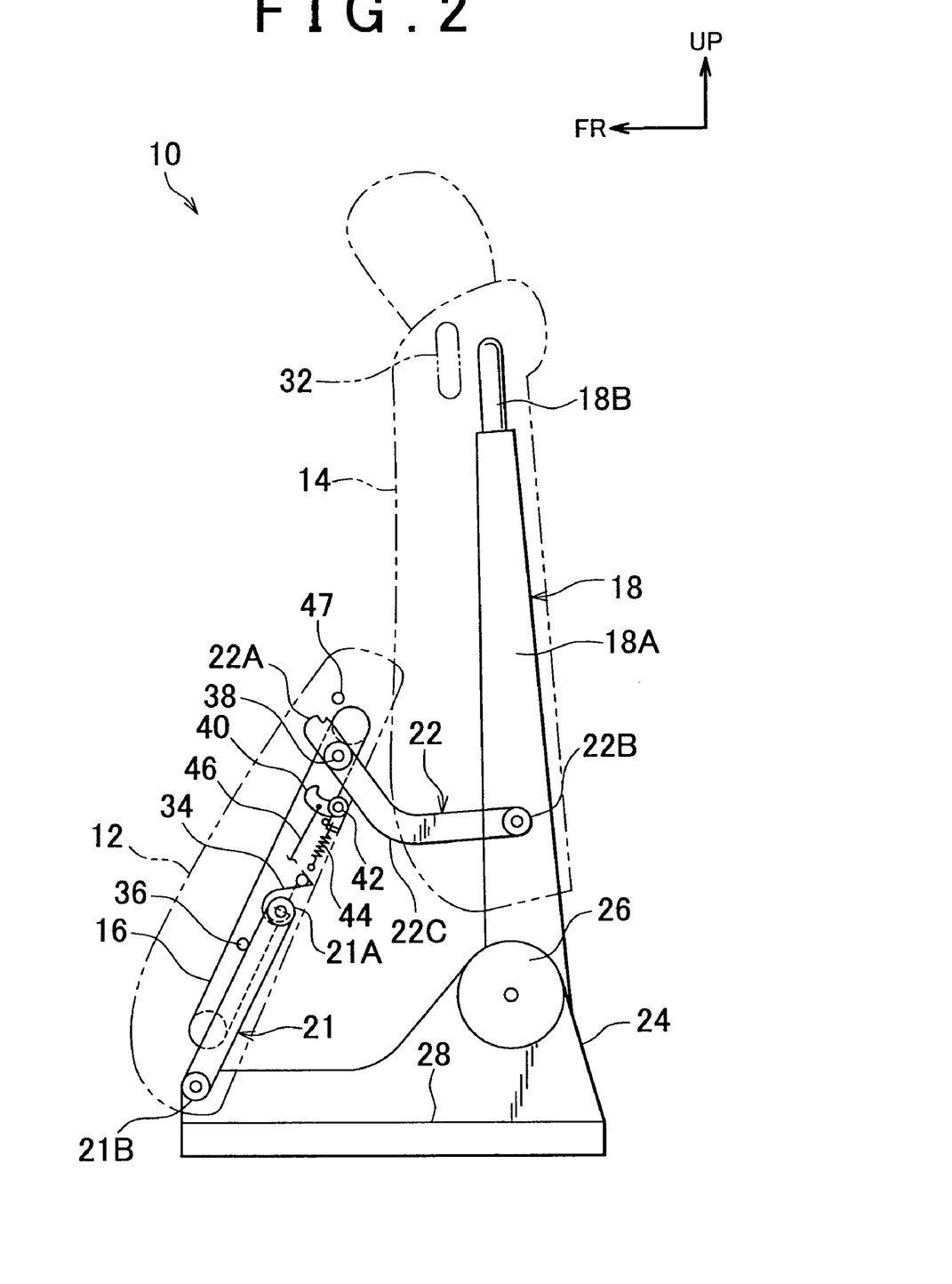
FIG. 2 is a side view showing the vehicular seat device in accordance with the first embodiment of the invention when the seat arrangement is an entry/exit state.
Figure 3:
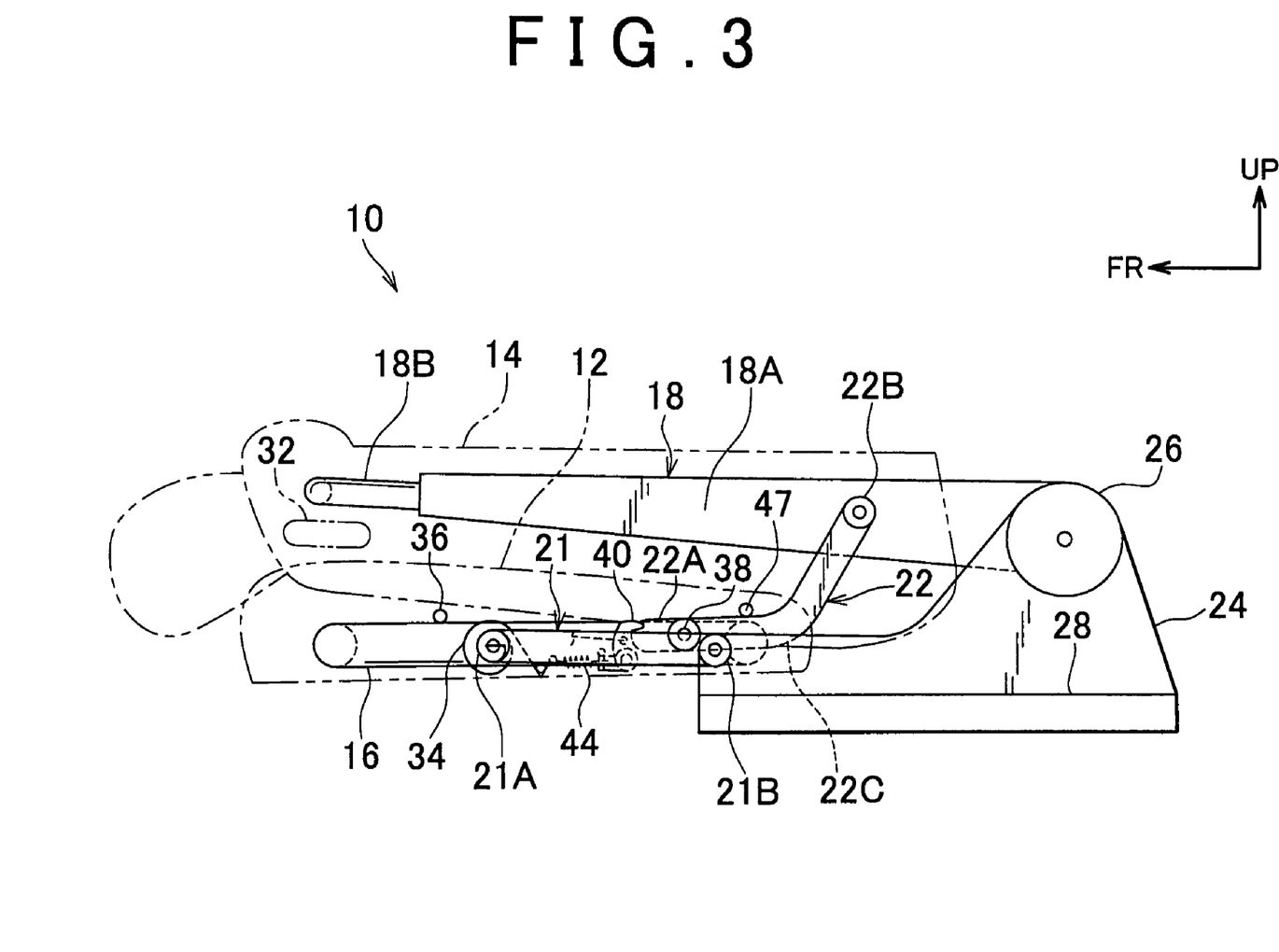
FIG. 3 is a side view showing the vehicular seat device in accordance with the first embodiment of the invention when the seat arrangement is a retracted state.

In FIGS. 1 to 3, a vehicular seat device 10 in accordance with a first embodiment of the invention has a seat cushion 12, a seatback 14, a first linking member 21, and a second linking member 22. As seat arrangements in which the seatback 14 is tilted forward, the vehicular seat device 10 assumes a retracted state shown in FIG. 3 in which the seat cushion 12 is moved downward and toward the front of the vehicle and the seatback 14 is superimposed on an upper side of the seat cushion 12, and an entry/exit state shown in. FIG. 2 in which the seat cushion 12 is in a standing state to produce a space rearward of the seat for a passenger to get in or out. As a seat arrangement in which the seatback 14 is not tilted forward, and the seat cushion is not moved forward downward relative to the vehicle or the seat cushion is not in the standing state, but an occupant can sit, the vehicular seat device 10 assumes a seating state shown in FIG. 1.

The seat cushion 12 is a component part that has a seat cushion frame 16 and that makes up a seat surface on which an occupant (not shown) can sit. The seat cushion frame 16 is, for example, a generally square frame-like body, and is provided with, for example, a net-like spring (not shown). The seat cushion frame 16 is covered with a cushion material (not shown) that has been formed into a predetermined shape, and in turn, the cushion material is covered with a seat shell (not shown).

The seatback 14 has a seatback frame 18. The seatback frame 18 is a component part which is provided on a base member 24 via a reclining mechanism 26 so that the inclination angle thereof can be adjusted, and which makes up a backrest for an occupant. The seatback frame 18 has side frames 18A that are provided on both sides in the vehicle width direction, and an upper pipe 18B linking upper portions of the side frames 18A.

The side frames 18A are provided with, for example, a net-like spring (not shown). The seatback frame 18 is covered with a cushion material (not shown) that has been formed into a predetermined shape, and in turn, the cushion material is covered with a seat shell (not shown).

The base member 24 is disposed on a seat slide mechanism 28 that allows the adjustment of the seat position in the longitudinal direction of the vehicle. The reclining mechanism 26 is disposed in a rear portion of the base member 24. A lower end of each side frame 18A of the seatback frame 18 is linked to the reclining mechanism 26. An operating lever 32 that is operated to alter the seat arrangement is provided in, for example, a side surface of the seatback 14. As for the operating lever 32, an operating lever to be used to alter the seat arrangement to the retracted state, and an operating lever to be used to alter the seat arrangement to the entry/exit state may be separately provided.

The reclining mechanism 26 has a restriction mechanism (not shown) that restrict the tiling action of the seatback 14. The restriction mechanism is constructed so that when the seat arrangement is changed from the seating state to the entry/exit state (a walk-in state, i.e., a state in which the seat cushion 12 is stood up, and specifically, the seat cushion 12 is stood up, and the seat slide mechanism 28 is unlocked, and the seat is moved approximately to a forefront position), the seatback 14 can be held so as not to fall in any further after the seatback 14 has been tilted forward to a predetermined inclination angle. Furthermore, when the seat arrangement is changed from the seating state to the retracted state, the restriction of the tilting action of the seatback 14 within the predetermined inclination angle by the restriction mechanism is released, and therefore the seatback 14 can be tilted forward to a position where the seatback 14 is superimposed on the seat cushion 12 to assume a folded state.

A first end 21A of the first linking member 21 is pivotably linked to the seat cushion frame 16 at a position forward of a first end 22A of the second linking member 22 described later. A second end 21B of the first linking member 21 is pivotably linked to the base member 24. A first end 21A of the first linking member 21 is provided with a spiral spring 34 that urges the seat cushion 12 in such a direction as to flip up a rear side of the seat cushion 12. The seat cushion frame 16 is provided with a protruded stopper 36 for restricting the maximum flip-up angle of the seat cushion 12 by contacting the first linking member 21 as shown in FIG. 2.

The second linking member 22 has a shape of, for example, a boomerang. The first end 22A thereof is pivotably linked to the seat cushion frame 16 at a position rearward of the first end 21A of the first linking member 21. A second end 22B of the second linking member 22 is pivotably linked to a portion of the seatback frame 18 which is upward of the reclining mechanism 26 relative to the vehicle when the seatback 14 is in the standing state. Concretely, the first end 22A of the second linking member 22 is journaled to the seat cushion frame 16 by a support shaft 38, and is constructed so as to engage with a lock member 40 as shown in FIG. 1 when the seat arrangement is the seating state or the retracted state. As shown in FIG. 1, the second linking member 22 extends along the seat cushion 12, rearward relative to the seat. The second linking member 22 has a curved portion 22C near the rear end of the seat cushion 12 such that the second end 22B is formed diagonally upward from the curved portion 22C relative to the vehicle.

As shown in FIG. 1, the lock member 40 is a pawl-like member pivotably journaled to the seat cushion frame 16 by a support shaft 42. The lock member 40 is urged by, for example, a tension coil spring 44, so as to engage with the first end 22A of the second linking member 22 from above relative to the vehicle when the seat arrangement is the seating state or the retracted state. A first end of a lock-releasing cable 46 is linked to the lock member 40, and a second end of the lock-releasing cable 46 is linked to the operating lever 32. By drawing the lock-releasing cable 46 against the spring force of the tension coil spring 44 by operating the operating lever 32, the lock member 40 is disengaged from the first end 22A of the second linking member 22.

As shown in FIG. 1, the seat cushion frame 16 is provided with a stopper 47 that contacts the second linking member 22 from above when the seat arrangement is the seating state.

The embodiment is constructed as described above, and the operation thereof will be described below. In FIG. 1, when the seat arrangement is the seating state in the vehicular seat device 10, the stopper 47 provided on the seat cushion frame 16 is in contact with the second linking member 22, whereby the seat cushion 12 and the seatback 14 are held in the seating state in which, for example, they are each inclined rearward to an appropriate degree. In this state, since the lock member 40 is engaged with the first end 22A of the second linking member 22, the rear side of the seat cushion 12 is not flipped up by the spring force of the spiral spring 34.

Next, the operation of the vehicular seat device 10 when the seat arrangement is changed to the entry/exit state will be described with reference to FIGS. 1 and 2. In this case, the seat arrangement can be changed to the entry/exit state by performing a predetermined operation with the operating lever 32 and tilting the seatback 14 forward. Concretely, when the predetermined operation with the operating lever 32 is performed, the lock-releasing cable 46 is drawn to disengage the lock member 40 from the first end 22A of the second linking member 22 against the spring force of the tension coil spring 44 and therefore release the locked state, so that the seat cushion 12 can be pivoted by the spring force of the spiral spring 34. Furthermore, when the predetermined operation with the operating lever 32 is performed, the locked state of the seatback 14 held by the reclining mechanism 26 is released, separately from the release of the locked state held by the lock member 40, so that the seatback 14 becomes able to be tilted forward.

By tilting the seatback 14 forward from this state, the rear side of the seat cushion 12 is flipped up about the first end 21A of the first linking member 21 by the spring force of the spiral spring 34. If the spring force of the spiral spring 34 is great, the upward flip of the seat cushion 12 draws the seatback 14 forward relative to the vehicle via the second linking member 22, so that the seatback 14 assumes a forward tilted state without a need to perform an operation of tilting the seatback 14 forward. The upward flip of the seat cushion 12 stops when the stopper 36 contacts the first linking member 21.

Thus, in the vehicular seat device 10, the seat arrangement can be changed by a simple operation to a form in which the longitudinal width of the seat is made further smaller, thus producing such a large space behind the seat as to allow an occupant to easily get into or out of the vehicle. Furthermore, the second linking member 22 is linked to a position on the seatback frame 18 which is different from the position of the pivot shaft of the reclining mechanism 26, that is, a position on the seatback frame 18 which is upward of the reclining mechanism 26 relative to the vehicle when the seatback 14 is in the standing state. Therefore, the motion of the second linking member 22 is not directly affected by the action of the reclining mechanism 26, but the seat arrangement can be smoothly changed to the entry/exit state.

It is also allowable that when a predetermined operation is performed with the operating lever 32, the locked state of the base member 24 held by the seat slide mechanism 28 be released, so that the entire seat can be moved forward relative to the vehicle. This will produce a further enlarged space for an occupant's entry/exit behind the seat.

Next, the operation when the seat arrangement is changed to the retracted state will be described with reference to FIGS. 1 and 3. In this case, the seat arrangement can be changed to the retracted state by performing a predetermined operation with the operating lever 32 and tiling the seatback 14 forward. Concretely, when the predetermined operation with the operating lever 32 is performed, the locked state of the seatback 14 held by the reclining mechanism 26 is released, so that the seatback 14 becomes able to be tilted forward. At this time, the locked state of the second linking member 22 held by the lock member 40 is not released.

When during this state the seatback 14 is tilted forward, the first linking member 21 pivots forward relative to the vehicle about the second end 21B, and the second linking member 22 moves integrally with the seat cushion frame 16, so that the seat cushion 12 moves forward relative to the vehicle, and furthermore, the seatback 14 is superimposed on the upper side of the seat cushion 12. Thus, the seat arrangement is changed into the retracted state.

Since the second linking member 22 has a boomerang shape, the seatback 14 can be laid over the upper side of the seat cushion 12. Furthermore, the second linking member 22 is linked to a position on the seatback frame 18 which is different from the position of the pivot shaft of the reclining mechanism 26, that is, the position on the seatback frame 18 which is offset from the reclining mechanism 26 so as to be upward of the reclining mechanism 26 relative to the vehicle when the seatback 14 is put in the standing state. Therefore, in accordance with the amount of the offset, the seat cushion 12 can be moved forward relative to the vehicle.

At this time, the forward movement of the vehicular seat device 10 via the seat slide mechanism 28 is not performed. However, it is also possible to cause the forward movement thereof via the seat slide mechanism 28. Furthermore, the seat arrangement can be returned to the seating state merely by pulling up the seatback 14. In this operation, when the seat cushion 12 and the seatback 14 return to the seating state, the stopper 47 of the seatback frame 18 contacts the second linking member 22, and the seatback frame 18 is locked by the reclining mechanism 26.

Thus, the vehicular seat device 10 can be put in various seat arrangements without giving great operation burden to a person who performs such a seat operation.

Figure 4:
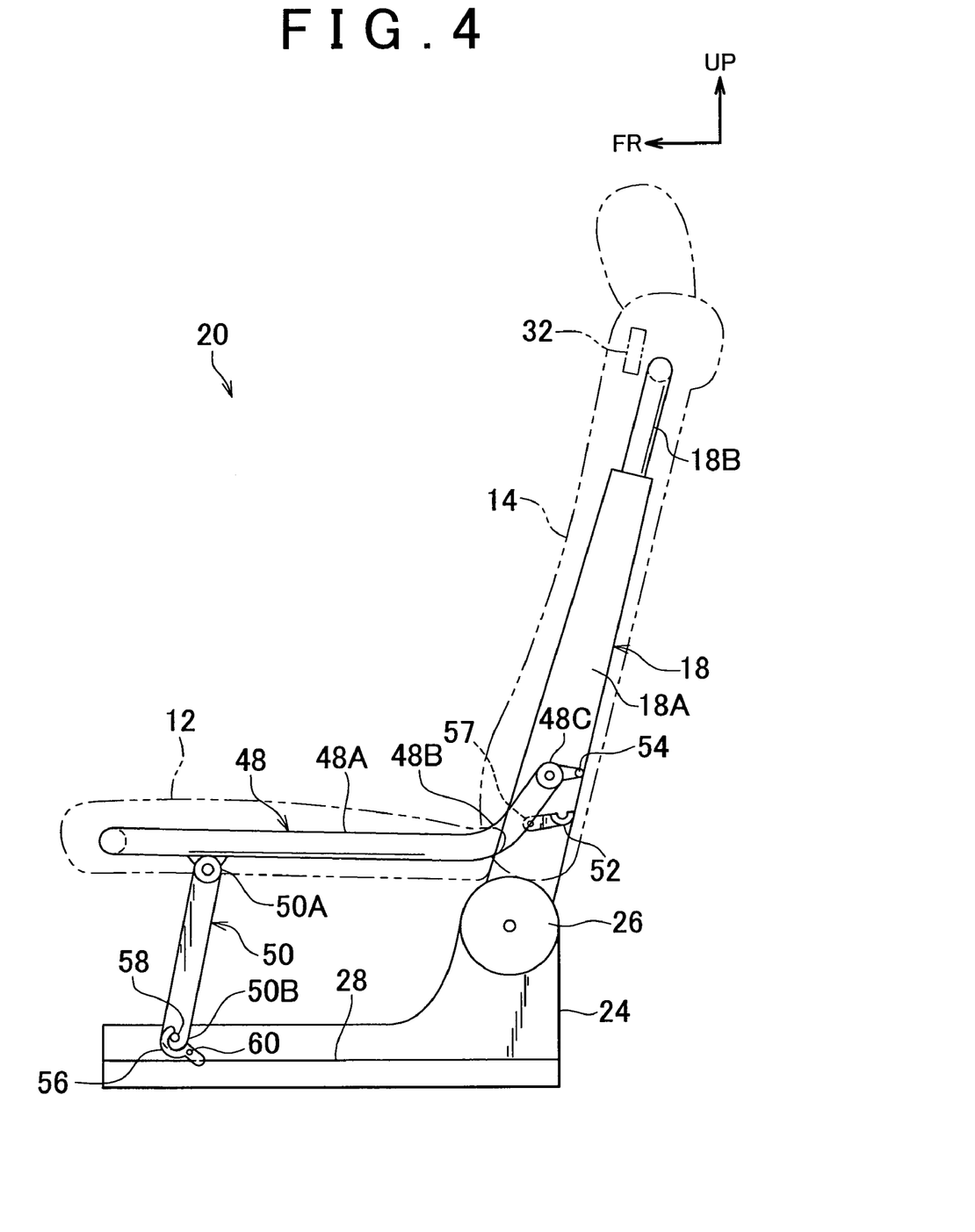
FIG. 4 is a side view showing a vehicular seat device in accordance with a second embodiment of the invention when the seat arrangement is a seating state.

Referring to FIG. 4, a vehicular seat device 20 in accordance with a second embodiment of the invention is different from the vehicular seat device 10 of the first embodiment, in that a seat cushion frame 48 is pivotably linked to a position on a seatback frame 18 which comes above a reclining mechanism 26 when a seatback 14 is put in a standing state. Furthermore, the vehicular seat device 20 has a linking member 50 that links a front portion of the seat cushion frame 48 to a base member 24.

Concretely, two side portions 48A of the seat cushion frame 48 which are located at two sides in the vehicle width direction extend along the seat cushion 12 toward a rear of the seat. Each side portion 48A has a curved portion 48B near the rear end of the seat cushion 12. A rear end 48C of the seat cushion frame 48 extending from the curved portion 48B rearward diagonally upward relative to the vehicle is pivotably linked to a side frame 18A of the seatback frame 18. The side frame 18A is provided with a lock member 52. On the other hand, the rear end 48C of the seat cushion frame 48 is provided with a pin 54 that is engaged with the lock member 52 when the seat arrangement is changed to the entry/exit state. It is also allowable that a spring (not shown) that urges the seat cushion frame 48 in the flip-up direction be provided on the rear end 48C of the seat cushion frame 48.

The lock member 52 is journaled to the side frame 18A by a support shaft 57, and is linked to an operating lever 32 by a lock-releasing cable (not shown). The lock member 52 engages with the pin 54 to retain the flipped-up state of the seat cushion 12, when the seat arrangement is changed to the entry/exit state. Furthermore, when the seat arrangement is to be returned from the entry/exit state to the seating state, the lock member 52 can be disengaged from the pin 54 by operating the operating lever 32. Although not shown in the drawings, the lock member 52 may be urged by a spring or the like in such a direction as to engage with the pin 54.

A first end 50A of the linking member 50 is pivotably linked to a front portion of the seat cushion frame 48. A second end 50B thereof is constructed so that it is detachably engageable with the base member 24 by a lock member 56 and, when linked to the base member 24, becomes pivotable relative to the base member 24. Concretely, the lock member 56 is journaled to the base member 24 by a support shaft 60, and a pin 58 that is engageable with the lock member 56 is attached to the second end portion 50B of the linking member 50.

The lock member 56 is linked to the operating lever 32 by a lock-releasing cable (not shown). Operating the operating lever 32 causes the engagement of the lock member 56 with the pin 58 when the seat arrangement is the seating state or is to be changed from the seating state to the retracted state, and causes the disengagement of the lock member 56 from the pin 58 when the seat arrangement is to be changed from the seating state to the entry/exit state. Although not shown in the drawings, the lock member 56 may be urged by a spring or the like in such a direction as to engage with the pin 58.

Other portions of the second embodiment are the same as those of the first embodiment, and are affixed with the same reference characters in the drawings, and will not be described again.

This embodiment is constructed as descried above, and the operation of thereof will be described below. In FIG. 4, when the seat arrangement is the seating state in the vehicular seat device 20, the second end 50B of the linking member 50 is linked to the base member 24 by the lock member 56, whereby the linking member 50 is in a standing state. At this time, the seatback 14 is in a locked state held by the reclining mechanism 26, so that the seat cushion 12 and the seatback 14 are held in a seating state in which, for example, they are each inclined rearward to an appropriate degree.

Figure 5:
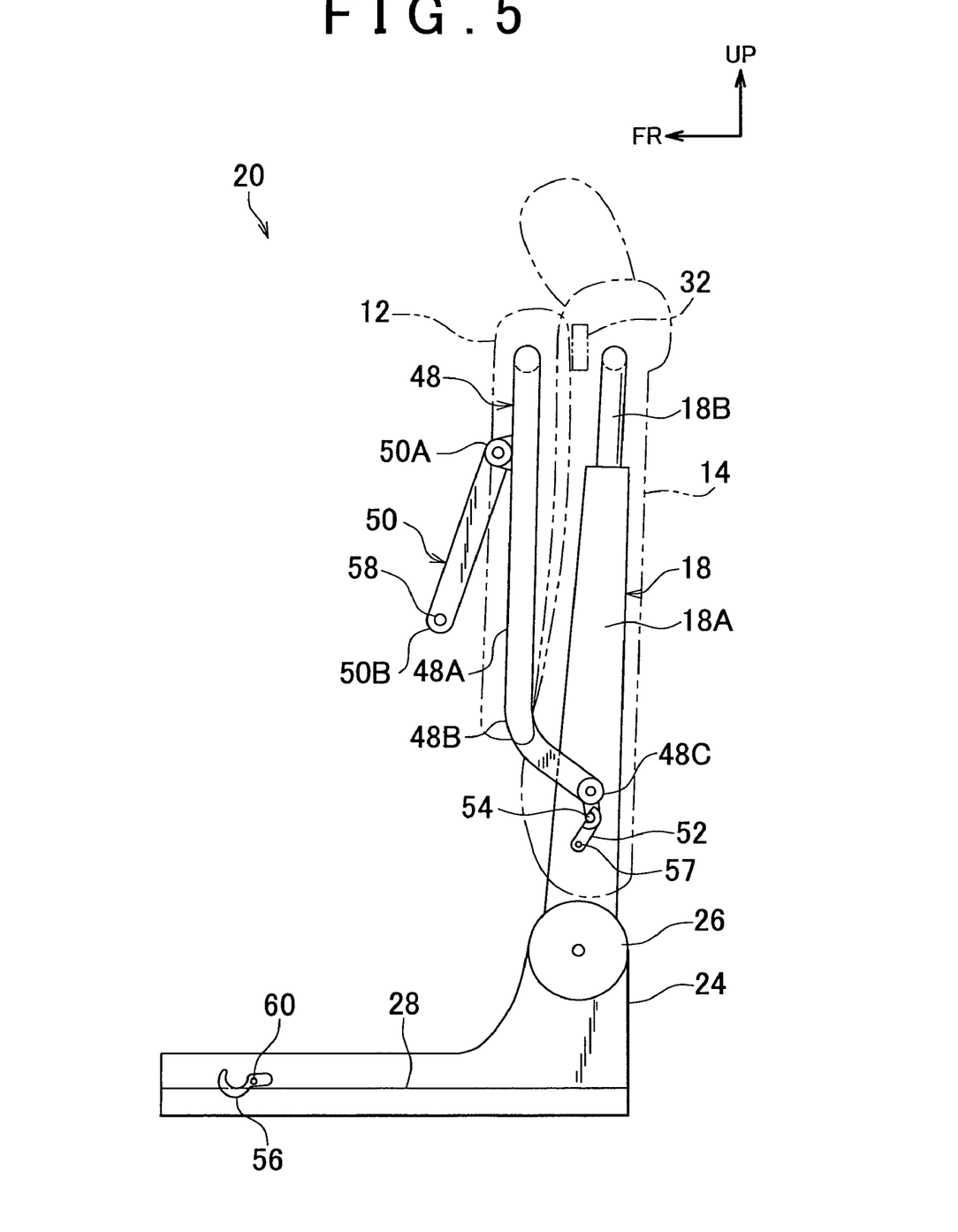
FIG. 5 is a side view showing the vehicular seat device in accordance with the second embodiment of the invention when the seat arrangement is an entry/exit state.

Next, the operation of the vehicular seat device 10 when the seat arrangement is changed to the entry/exit state will be described with reference to FIGS. 4 and 5. In this case, the seat arrangement can be changed to the entry/exit state by performing a predetermined operation with the operating lever 32 and tilting the seatback 14 forward, Concretely, when the predetermined operation with the operating lever 32 is performed, the lock-releasing cable is drawn to release the lock member 56, so that the linking member 50 is released from the base member 24. Therefore, a front side of the seat cushion 12 becomes able to be flipped upward relative to the vehicle about the linking portion of the seat cushion frame 48 to the side frame 18A, that is, the rear end 48C of the seat cushion frame 48.

As, from this state, the front side of the seat cushion 12 is flipped upward relative to the vehicle so that the seat cushion 12 is overlapped with a side of the seatback 14 that faces forward relative to the vehicle, the pin 54 of the seat cushion frame 48 engages with the lock member 52, whereby the flipped-up state of the seat cushion 12 is held. The locked state of the seat cushion 12 held by the lock member 52 can be released by the operation of the operating lever 32 performed when the seat arrangement is to be returned to the seating state. Incidentally, in the case where the seat cushion 12 is urged by a spring or the like in the flip-up direction, the seat cushion 12 is automatically flipped up by the spring force of the spring or the like when the linked state of the linking member 50 and the base member 24 is released.

Furthermore, when the predetermined operation with the operating lever 32 is performed, the locked state of the seatback 14 held by the reclining mechanism 26 is released, separately from the release of the locked state held by the lock member 56, so that the seatback 14 becomes able to be tilted forward. In the entry/exit state shown in FIG. 5, the seatback 14 has been pivoted forward so as to be in a substantially upright state. Thus, in the vehicular seat device 20, the seat arrangement can be changed to a form in which the longitudinal width of the seat is reduced, that is, a form in which the seat cushion 12 is overlapped with the vehicularly forward side of the seatback 14, by a simple operation, so that a further enlarged space for the entry/exit of an occupant can be produced behind the seat. It is also allowable that when a predetermined operation is performed with the operating lever 32, the locked state of the base member 24 held by the seat slide mechanism 28 be released, so that the entire seat can be moved forward relative to the vehicle. This will produce a further enlarged space for an occupant's entry/exit behind the seat.

Figure 6:
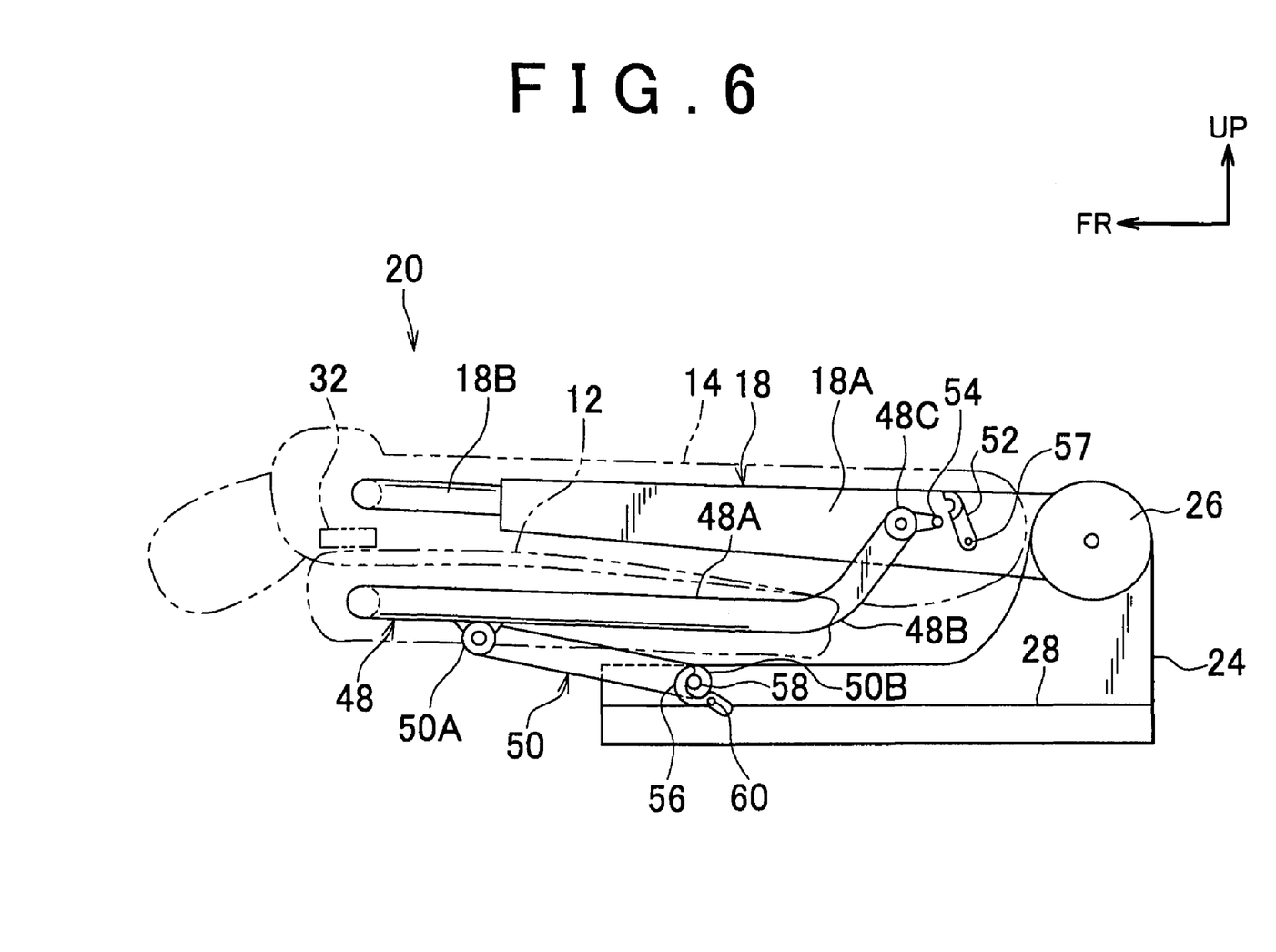
FIG. 6 is a side view showing the vehicular seat device in accordance with the second embodiment of the invention when the seat arrangement is a retracted state.

Next, the operation when the seat arrangement is changed to the retracted state will be described with reference to FIGS. 4 and 6. In this case, the seat arrangement can be changed to the retracted state by performing a predetermined operation with the operating lever 32 and tiling the seatback 14 forward. Concretely, when the predetermined operation with the operating lever 32 is performed, the locked state of the seatback 14 held by the reclining mechanism 26 is released, so that the seatback 14 becomes able to be tilted forward. At this time, since the linked state between the linking member 50 and the base member 24 held by the lock member 56 is not released, the linking member 50 can be pivoted about the second end 50B.

When from this state the seatback 14 is tilted forward, the linking member 50 pivots forward relative to the vehicle about the second end 50B, and the seatback frame 18 also pivots forward relative to the vehicle about the reclining mechanism 26. Therefore, the seat cushion frame 48 is pushed forward downward relative to the vehicle, so that the seat cushion 12 moves forward downward relative to the vehicle, and the seatback 14 is superimposed on the upper side of the seat cushion 12. Thus, the seat arrangement is changed to the retracted state.

Since the rear end 48C of the seat cushion frame 48 extends from the curved portion 48B rearward upward diagonally relative to the vehicle, the seatback 14 can be laid over the upper side of the seat cushion 12. Furthermore, the seat cushion frame 48 is linked to a position on the seatback frame 18 which is different from the position of the pivot shaft of the reclining mechanism 26, that is, the position on the seatback frame 18 which is offset from the reclining mechanism 26 so as to be upward of the reclining mechanism 26 relative to the vehicle when the seatback 14 is put in the standing state. Therefore, in accordance with the amount of the offset, the seat cushion 12 can be moved forward relative to the vehicle.

At this time, the forward movement of the vehicular seat device 20 via the seat slide mechanism 28 is not performed. However, it is also possible to cause the forward movement thereof via the seat slide mechanism 28. Furthermore, the seat arrangement can be returned to the seating state merely by pulling up the seatback 14. In this operation, when the seatback 14 is pulled up to the inclination angle of the seating state, the seatback 14 is locked by the reclining mechanism 26.

Thus, the vehicular seat device 20 can be put in various seat arrangements without giving great operation burden to a person who performs such a seat operation.

Figure 7:
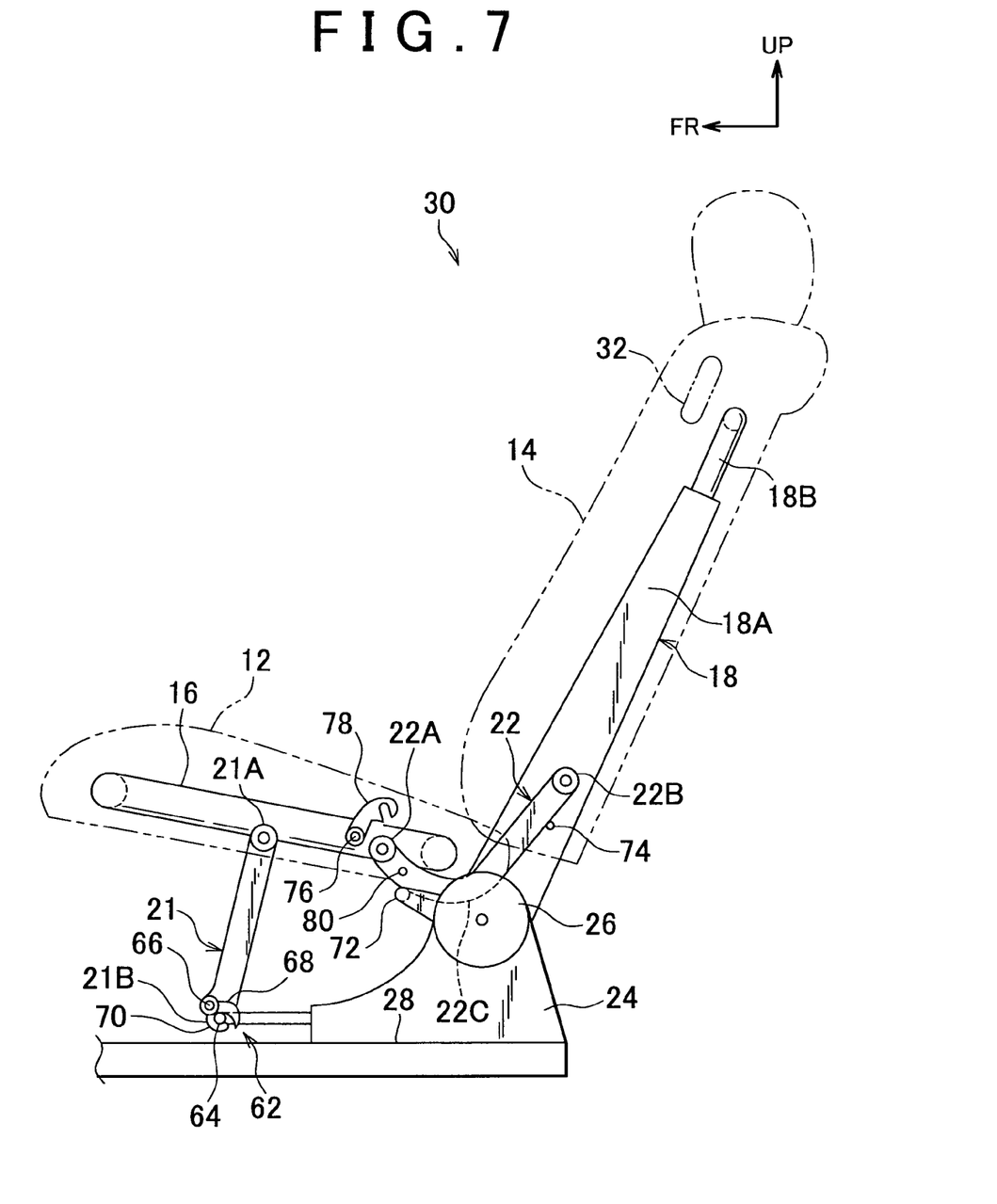
FIG. 7 is a side view showing a vehicular seat device in accordance with a third embodiment of the invention when the seat arrangement is a seating state.

In FIG. 7, a vehicular seat device 30 in accordance with a third embodiment of the invention is different from the vehicular seat device 10 of the first embodiment in that a first linking member 21 is detachable from a base member 24. Concretely, a lock member 62 provided on a second end 21B of the first linking member 21 is detachably engageable with a support pin 64 that extends from the base member 24 forward relative to the vehicle.

The lock member 62 has a movable pawl 68 that is journaled to the first linking member 21 by a support shaft 66, and a fixed pawl 70 that faces the movable pawl 68 and that is able to clamp the support pin 64 in cooperation with the movable pawl 68. The movable pawl 68 is urged by a spring (not shown) in such a direction as to reduce the space between the movable pawl 68 and the fixed pawl 70, and is linked to an operating lever 32 by a lock release cable (not shown). By operating the operating lever 32 to draw the lock release cable, the movable pawl 68 is moved in the opening direction to release the support pin 64. The fixed pawl 70 is formed as a portion of the first linking member 21.

The vehicular seat device 30 is also slightly different from the device 10 of the first embodiment in the construction of a second linking member 22. The second linking member 22 in the second embodiment is the same as that in the first embodiment in that the a curved portion 22C is provided between a first end 22A linked to a rear portion of the seat cushion frame 16 and a second end 22B linked to a seatback frame 18, and that the second linking member 22 has a boomerang shape as a whole. However, the second linking member 22 in the second embodiment is different from the second linking member 22 in the first embodiment in that when the seat arrangement is the seating state, the curved portion 22C is positioned below the seat cushion frame 16.

On the other hand, the base member 24 is provided with a support member 72 that, for example, is protruded forward upward diagonally relative to the vehicle. The second linking member 22 is supported by the support member 72, below the seat cushion 12. Due to this construction, load from the seat cushion 12 can be transmitted from the second linking member 22 to the base member 24, and a rear portion of the seat cushion 12 can be supported by the base member 24.

Furthermore, a side frame 18A of the seatback frame 18 is provided with a stopper 74 that holds the seatback 14 in the seating state. When the seat arrangement is the seating state, the second linking member 22 contacts the stopper 74, so that the seatback 14 does not further tilt rearward relative to the vehicle. Similar to the second embodiment, when the seat arrangement is the seating state, the seatback 14 is locked by the reclining mechanism 26 as well, and this locked state can be released by operating the operating lever 32. The first end 22A of the second linking member 22 may be provided with a spring (not shown) that urges the seat cushion frame 16 in the flip-up direction.

In a portion of the seat cushion frame 16 adjacent to the first end 22A of the second linking member 22, a lock member 78 is journaled by a support shaft 76 thereto. The second linking member 22 is also provided with a pin 80 that is engaged with the lock member 78 where the seat arrangement is the entry/exit state. The lock member 78 is linked to the operating lever 32 by a lock release cable (not shown). By operating the operating lever 32 to draw the lock-releasing cable, the locked state of the pin 80 during the entry/exit state can be released.

Other portions are the same as those of the first embodiment, and are affixed in the same numbers in the drawings, and will not be described.

This embodiment is constructed as described above, and the operation thereof will be described below. In FIG. 7, when the seat arrangement is the seating state in the vehicular seat device 30, the second end 21B of the first linking member 21 is linked to the base member 24 by the lock member 62 engaged with the support pin 64, whereby the first linking member 21 is put in a standing state. At this time, the second linking member 22 is supported by the support member 72 provided on the base member 24, and is in contact with the stopper 74 provided on the side frame 18A of the seatback frame 18, whereby, the seat cushion 12 and the seatback 14 are held in the seating state in which, for example, they are each inclined rearward to an appropriate degree.

Figure 8:
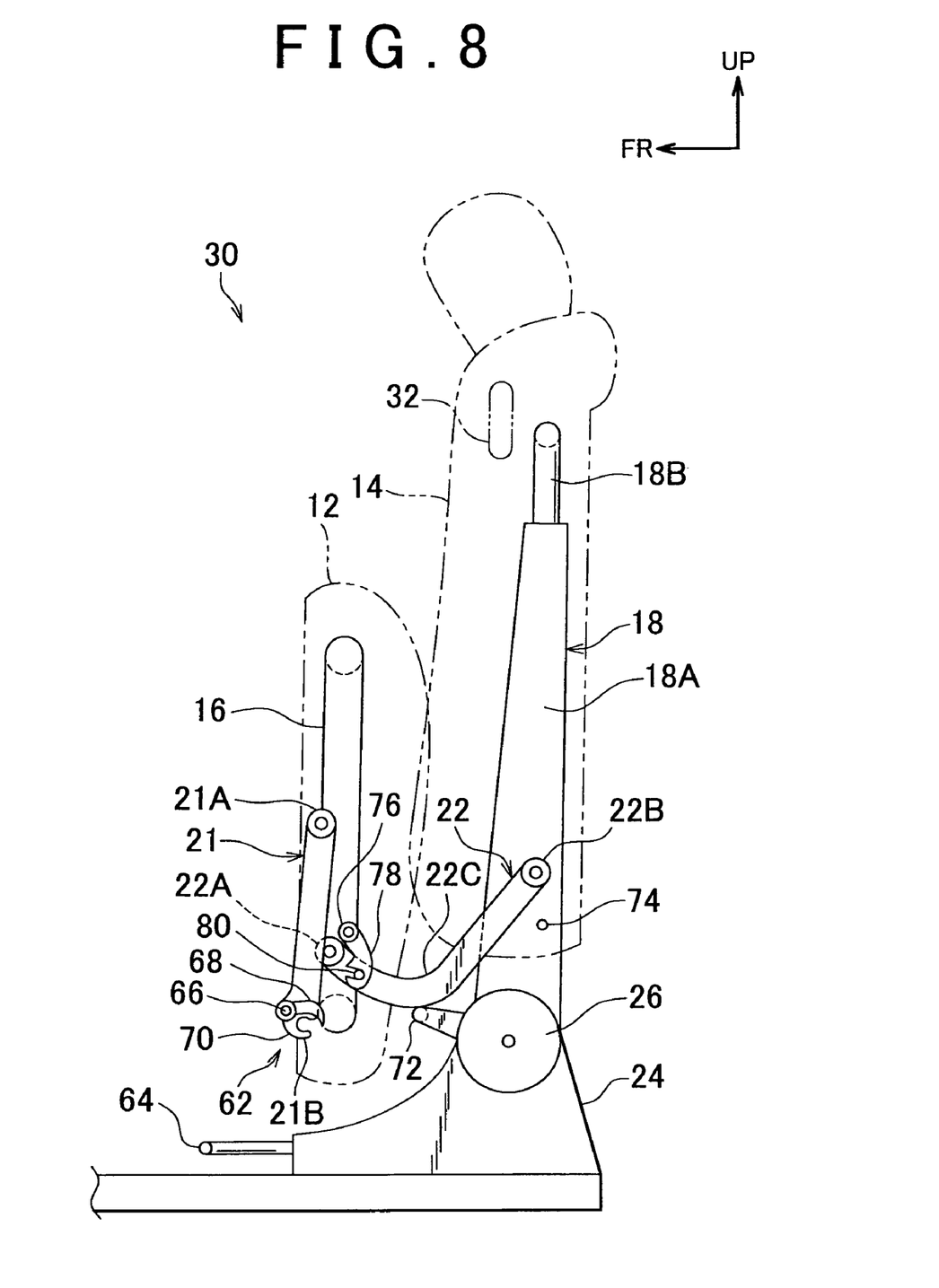
FIG. 8 is a side view showing the vehicular seat device in accordance with the third embodiment of the invention when the seat arrangement is an entry/exit state.

Next, the operation of the vehicular seat device 30 when the seat arrangement is changed to the entry/exit state will be described with reference to FIGS. 7 and 8. In this case, the seat arrangement can be changed to the entry/exit state by performing a predetermined operation with the operating lever 32 and tilting the seatback 14 forward. Concretely, when the predetermined operation with the operating lever 32 is performed, the lock-releasing cable (not shown) is drawn to pivot the movable pawl 68 of the lock member 62 about the support shaft 66 so that the space between the movable pawl 68 and the fixed pawl 70 is opened or enlarged. Due to this operation, the linking between the first linking member 21 and the base member 24 is released, so that a front side of the seat cushion 12 is able to be flipped upward relative to the vehicle about the first end 22A of the second linking member 22.

When from this state the front side of the seat cushion 12 is flipped upward relative to the vehicle so as to put the seat cushion 12 into a substantially vertical state, the lock member 78 provided on the seat cushion flame 16 engages with the pin 80 of the second linking member 22, whereby the flipped-up state of the seat cushion 12 is held. The locked state of the seat cushion 12 held by the lock member 78 can be released by the operation of the operating lever 32 performed when the seat arrangement is to be returned to the seating state. Incidentally, in the case where the seat cushion 12 is urged by a spring or the like in the flip-up direction, the seat cushion 12 is automatically flipped up by the spring force of the spring or the like when the linked state between the first linking member 21 and the base member 24 is released.

Furthermore, when the predetermined operation with the operating lever 32 is performed, the locked state of the seatback 14 held by the reclining mechanism 26 is released, separately from the release of the locked state held by the lock member 62, so that the seatback 14 becomes able to be tilted forward. In the entry/exit state shown in FIG. 8, the seatback 14 has been pivoted forward so as to be substantially upright. Thus, in the vehicular seat device 30, the seat arrangement can be changed to a form in which the longitudinal width of the seat is made smaller, that is, a form in which the seat cushion 12 is overlapped with the vehicularly forward side of the seatback 14, by a simple operation, so that a further enlarged space for the entry/exit of an occupant can be produced behind the seat. It is also allowable that when a predetermined operation is performed with the operating lever 32, the locked state of the base member 24 held by the seat slide mechanism 28 be released, so that the entire seat can be moved forward relative to the vehicle. This will produce a further enlarged space for an occupant's entry/exit behind the seat.

Figure 9:
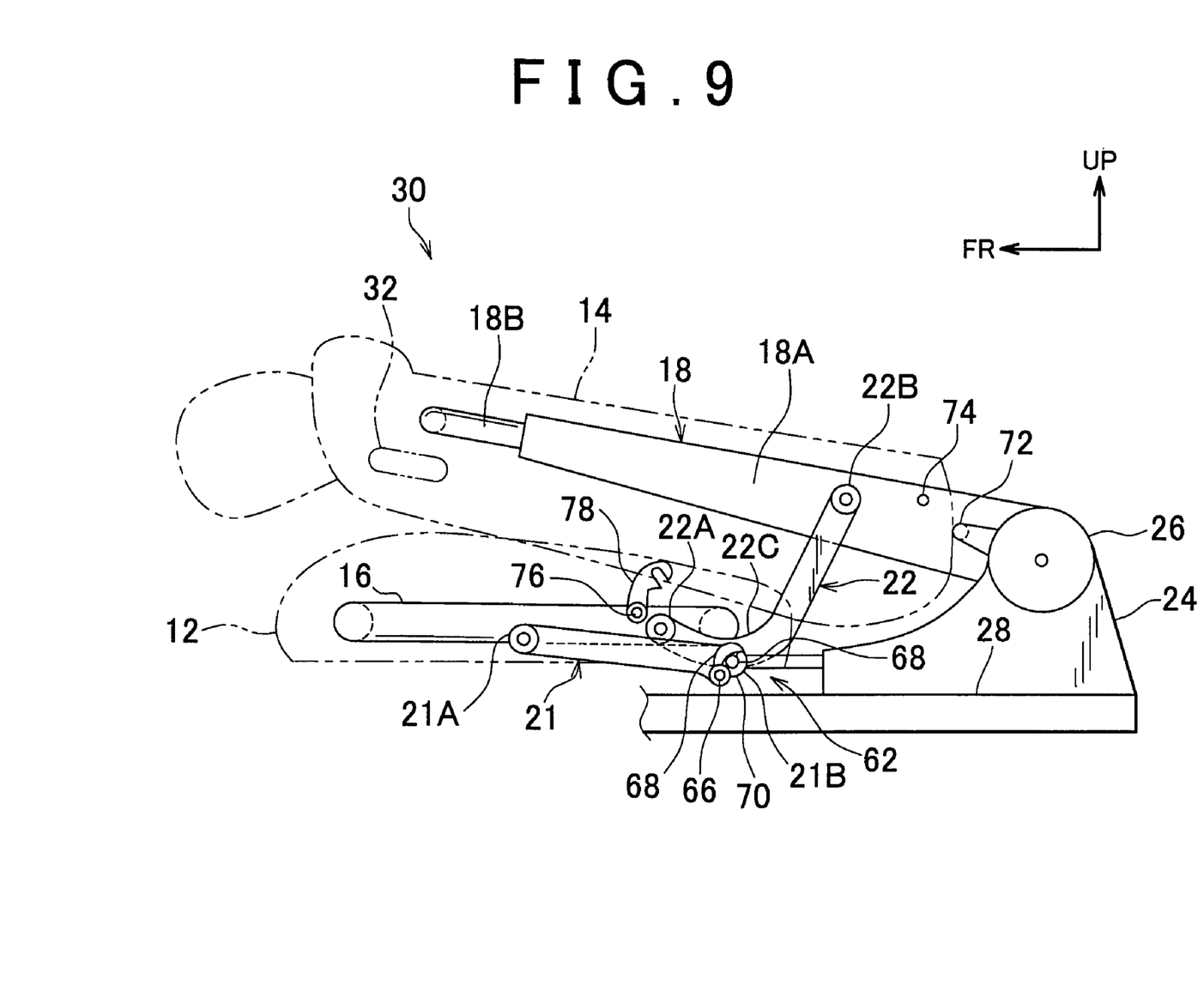
FIG. 9 is a side view showing the vehicular seat device in accordance with the third embodiment of the invention when the seat arrangement is a retracted state.

Next, the operation when the seat arrangement is changed to the retracted state will be described with reference to FIGS. 7 and 9. In this case, the seat arrangement can be changed to the retracted state by performing a predetermined operation with the operating lever 32 and tiling the seatback 14 forward. Concretely, when the predetermined operation with the operating lever 32 is performed, the locked state of the seatback 14 held by the reclining mechanism 26 is released, so that the seatback 14 becomes able to be tilted forward. At this time, since the linked state between the first linking member 21 and the base member 24 held by the lock member 62 is not released, the first linking member 21 can be pivoted about the second end 21B.

When from this state the seatback 14 is tilted forward, the first linking member 21 pivots forward relative to the vehicle about the second end 21B, and simultaneously with the tilt of the seatback 14, the second linking member 22 moves forward downward relative to the vehicle, so that the seat cushion 12 moves forward downward relative to the vehicle, and the seatback 14 is superimposed on the upper side of the seat cushion 12. Thus, the seat arrangement is changed to the retracted state.

Since the second linking member 22 has a boomerang shape, the seatback 14 can be laid over the upper side of the seat cushion 12. Furthermore, the second linking member 22 is linked to a position on the seatback frame 18 which is different from the position of the pivot shaft of the reclining mechanism 26, that is, the position on the seatback frame 18 which is offset from the reclining mechanism 26 so as to be upward of the reclining mechanism 26 relative to the vehicle when the seatback 14 is put in the standing state. Therefore, in accordance with the amount of the offset, the seat cushion 12 can be moved forward relative to the vehicle.

When the seat arrangement is the seating state, the second linking member 22 is supported by the support member 72. When the seat arrangement is to be changed to the retracted state, the second linking member 22 can slide on the support member 72 when moving forward and downward relative to the vehicle. Therefore, the useless fall in a rear portion of the seat cushion 12 can be prevented, and the seat cushion 12 and the seatback 14 can be smoothly folded in.

At this time, the forward movement of the vehicular seat device 30 via the seat slide mechanism 28 is not performed. However, it is also possible to cause the forward movement thereof via the seat slide mechanism 28. Furthermore, the seat arrangement can be returned to the seating state merely by pulling up the seatback 14. In this operation, when the seat cushion 12 and the seatback 14 return to the seating state, the second linking member 22 contacts the stopper 74 of the seatback frame 18, and the seatback frame 18 is locked by the reclining mechanism 26.

Thus, the vehicular seat device 30 can be put in various seat arrangements without giving great operation burden to a person who performs such a seat operation.

As for the first linking member 21, the second linking member 22, the linking member 50, etc., in the foregoing embodiments, these components may be provided in a pair of left and right members so as to enable the smooth changing of the seat arrangement. Furthermore, the foregoing embodiments have been described with reference to the constructions that allow the seat arrangement to be changed from the seating state to the entry/exit state and the retracted state by simple operations. The shapes and arrangements of the various linking members, the arrangements and the like of lock members, and the constructions of details may be suitably changed in accordance with the design of the vehicular seat device.

The invention claimed is:

1. A vehicular seat device comprising:
   a seat cushion having a seat cushion frame;
   a seatback having a seatback frame and provided on a base member via a reclining mechanism so that an inclination angle of the seatback is adjustable;
   a first linking member whose first end is pivotably linked to the seat cushion frame and whose second end is pivotably linked to the base member; and
   a second linking member whose first end is pivotably linked to a portion of the seat cushion frame which is rearward of a linking position to the first linking member and whose second end is pivotably linked to a portion of the seatback frame which is upward of the reclining mechanism relative to a vehicle when the seatback is in an upright position,
   wherein seat arrangements of the vehicular seat device include a retracted state in which the seat cushion is moved forward downward relative to the vehicle and the seatback is superimposed on an upper side of the seat cushion when the seatback is tilted forward, and an entry/exit state in which the seat cushion is in a substantially vertical state producing a space for entry or exit rearward of the vehicular seat device when the seatback is tilted forward so as to be in a substantially upright position, and
   wherein the first linking member is detachably engageable with the base member, the vehicular seat device further comprising
   a lock member pivotably provided on the seat cushion frame; and
   a pin which is provided on the second linking member and is configured to engage the lock member,
   wherein the first linking member is detached from the base member and the lock member is engaged with the pin when the seat arrangement is the entry/exit state.

2. The vehicular seat device according to claim 1, wherein the seat arrangements of the vehicular seat device further include a seating state in which the seatback is not tilted forward, and the seat cushion is not moved forward downward relative to the vehicle or the seat cushion is not in the substantially vertical state.

3. The vehicular seat device according to claim 2, wherein the second linking member has a curved portion, and the curved portion is curved downward relative to the vehicle when the seat arrangement is the seating state.

4. The vehicular seat device according to claim 3, wherein the curved portion is positioned downward of the seat cushion frame when the seat arrangement is the seating state.

5. The vehicular seat device according to claim 4, further comprising a support member that is provided on the base member and that is protruded forward diagonally upward relative to the vehicle, wherein the second linking member is supported by the support member.

6. The vehicular seat device according to claim 2, further comprising a stopper that is provided on a face of the seatback frame facing sideward relative to the vehicle so that when the seat arrangement is the seating state, the stopper contacts a face of the second linking member facing rearward relative to the vehicle.

7. The vehicular seat device according to claim 1, further comprising an operating lever for changing the seat arrangement,
   wherein by a first operation, engagement between the second end of the first linking member and the base member is released, and as a front side of the seat cushion is flipped upward to the entry/exit state relative to the vehicle, the lock member and the pin are engaged.

8. The vehicular seat device according to claim 1, wherein the base member is disposed on a seat slide mechanism that adjusts a seat position in a longitudinal direction relative to the vehicle.

* * * * *